Figure 1:
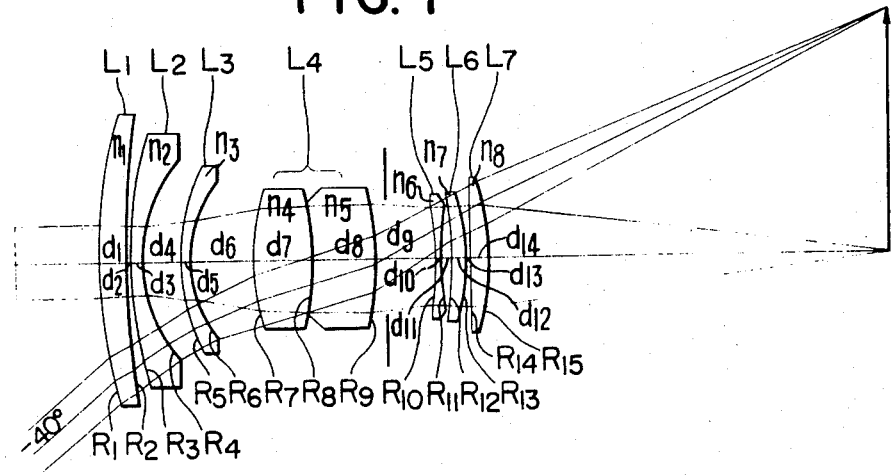

Mori

[15] 3,635,546
[45] Jan. 18, 1972

[54] RETROFOCUS-TYPE LENS SYSTEM
[72] Inventor: Ikuo Mori, Kawasaki-shi, Japan
[73] Assignee: Nippon Kogaku K.K., Tokyo, Japan
[22] Filed: Jan. 20, 1970
[21] Appl. No.: 6,821

[30] Foreign Application Priority Data
  Feb. 8, 1969  Japan..................................44/9006

[52] U.S. Cl................................................................350/214
[51] Int. Cl........................................G02b 9/64, G02b 13/04
[58] Field of Search..........................................350/214, 215

[56] References Cited

UNITED STATES PATENTS 3,512,874  5/1970  Woltche................................350/214

FOREIGN PATENTS OR APPLICATIONS 83,412  6/1964  France..................................350/214

*Primary Examiner*—John K. Corbin
*Attorney*—Harry G. Shapiro

[57] ABSTRACT

A wide angle retrofocus lens system consists of seven lenses $L_1$ through $L_7$. Lens $L_1$ is a positive meniscus with its convex surface directed to an object. Lens $L_2$ is a first negative meniscus and lens $L_3$ is a second negative meniscus, and both of the convex surfaces of these lenses $L_2$ and $L_3$ are directed to an object. Lens $L_4$ is a positive and lens $L_5$ is a negative lenses. Lens $L_6$ is a positive meniscus having concave surface directed to an object. Lens $L_7$ is a positive lens.

2 Claims, 11 Drawing Figures

— LATERAL SPHERICAL ABERRATION
—·— COMA OF −30°
----- COMA OF −40°

SPHERICAL ABERRATION

ASTIGMATISM

DISTORTION

ASTIGMATISM AT MAGNIFICATION RATIO OF 1/30

——— LATERAL SPHERICAL ABERRATION
—·— COMA OF −30°
----- COMA OF −38°

SPHERICAL ABERRATION

ASTIGMATISM

DISTORTION

3,635,546

RETROFOCUS-TYPE LENS SYSTEM

The present invention relates to a lens system and more particularly a wide-angle retrofocus-type lens system.

In the wide-angle retrofocus-type lens, the larger the distance from the first lens to the stop position becomes, the better the aberrations may be corrected. Especially the two aberrations of the astigmatism and the curvature of the field present this tendency strongly.

However, when the distance is increased, the diameter of the first lens must be increased so that the diameter of a filter attached to the lens system must be inevitably increased.

There may be no problem when the lens system is mounted to a small-sized camera such as 35-mm. cameras, but when the lens system is mounted to a large-sized single-lens reflex camera such as 6×6 or 6×7 cm., the operation will become very difficult because the diameters of the lens system and a filter attached thereto are exceedingly large.

Accordingly, the primary object of the present invention is to provide an improved wide-angle retrofocus-type lens system which can eliminate the above described defects.

Another object of the present invention is to provide a wide-angle retrofocus-type lens system compact in size having its aberrations reduced to the minimum.

In brief, the wide-angle retrofocus lens system in accordance with the present invention comprises a positive meniscus lens having its convex surface directed toward an object, two negative meniscus lenses each having its convex surface directed toward the object, a positive lens, a negative lens, a positive meniscus lens having it concave surface directed toward the object and a positive lens. In the lens system, the following conditions must be fulfilled:

I $\quad 0.6f < |f\Delta| < 0.9f$

II $\quad 0.45f < \sum_{1}^{6} d < 0.65f$

III $\quad d_7 + d_8 > d_5$

IV $\quad R_7 < |R_9|$ where
- $f$ = the compound focal length of the lens system;
- $f$ = the compound focal length of the diverging system (the first three lenses);
- $d$ = thickness of lens and air space;
- $R$ = radius of curvature; and $$\sum_{1}^{6} d =$$

the optical separation of the surfaces 1 and 7 ($d_1+d_2+d_3+d_4+d_5+d_6$).

The two most remarkable advantages of the present invention are as follows:

1. The diameters of the lens system as well as the filters thereof may be remarkably reduced. For example, the diameter of the filter is reduced only to approximately 0.6 of that of the conventional lens system having the same field angle with that of the lens system of the present invention.

2. The aberration of the curvature of the field, astigmatism and comma are corrected in a satisfactory manner even when the field angle is 80°, and the lens system which will be used suitably and advantageously for the large-sized single-lens reflex camera is obtained.

According to the embodiments of the present invention both of the lens systems having the $f$-numbers 4 and 2.8 and the field angles of 80° and 76° respectively have the back focal lengths more than 1.3 times as long as these of the lens systems.

Figure 3:
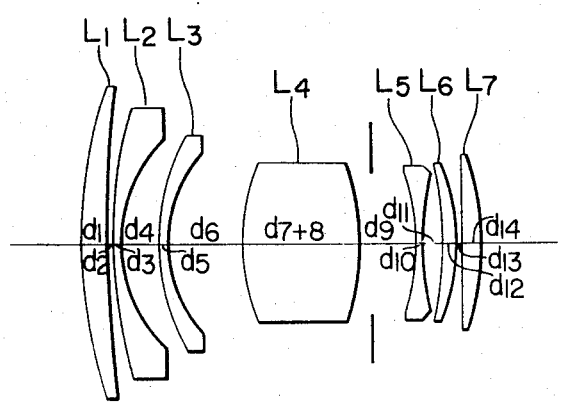
Figure 2A:
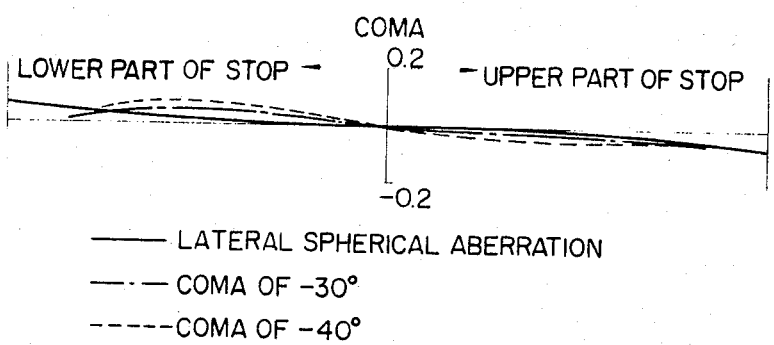
Figure 2B:
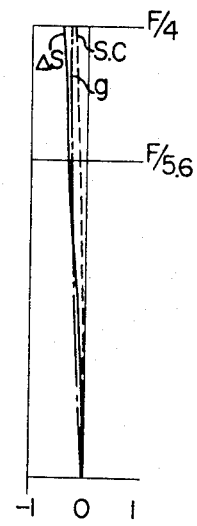
Figure 2C:
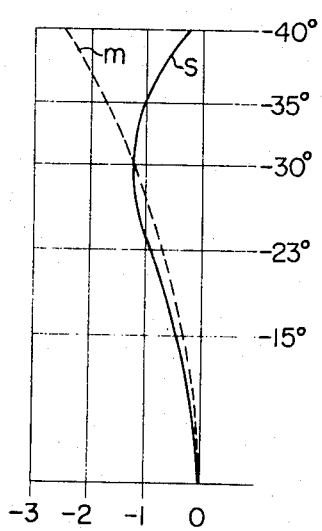

The above and other objects, features and advantages of the present invention will become more apparent from the following description of the illustrative embodiments thereof with reference to the accompanying drawing, in which:

FIG. 1, is a sectional view of a first embodiment of the present invention;

FIGS. 2(A)–2(C) show the aberration curves thereof;

FIG. 3 is a sectional view of a second embodiment of the present invention in which the lens ($L_4$ in FIG. 1) is replaced with a single lens; and FIGS. 4(A)–4(D) show the aberration curves thereof.

Referring to FIG. 1, a retrofocus-type lens in accordance with the present invention comprises a positive meniscus lens $L_1$ with its convex surface being directed toward an object, a first negative meniscus lens $L_2$ and a second negative meniscus lens $L_3$ both of the convex surfaces of the negative meniscus lenses being directed toward the object, a positive lens $L_4$, a negative lens $L_5$, a positive meniscus lens $L_6$ with its concave surface being directed toward an object and a positive lens $L_7$. And the following conditions are satisfied:

I $\quad 0.6f < |f\Delta| < 0.9f$

II $\quad 0.45f < \sum_{1}^{6} d < 0.65f$

III $\quad d_7 + d_8 > d_5$

IV $\quad R_7 < |R_9|$ where
- $f$ = the compound focal length;
- $f$ = the compound focal length of the diverging lens system $L_1$, $L_2$, and $L_3$;
- $d$ = thickness of the lens and the air space between the lenses;
- $R$ = radius of curvature of the lens; and $$\sum_{1}^{6} d =$$

the optical separation of the surfaces 1 and 7 ($d_1+d_2+d_3+d_4+d_5+d_6$).

In order to provide a retrofocus-type lens system compact in size, the distance between the first or outermost lens to the stop position must be reduced. For this purpose, it is the best method to reduce the air space, but a desired back focal length is not obtained only when the air space is reduced.

Therefore, according to the present invention, the diverging system has a very strong refracting force (Condition I), thereby ensuring the miniaturization and the long back focal length of the lens system. However, the problem is the increase of the negative distortion. In order to correct it, the positive meniscus lens is arranged at the outermost or first position of the lens system according to the present invention. In such a usage, the positive meniscus lens has a tendency of increasing its diameter so that in order to prevent it, it is preferable that the opposing surfaces between the positive meniscus lens $L_1$ and the negative meniscus lens $L_2$ have the following relation $1.8 < R_2/R_3 < 2.8$ so that the air space therebetween may be not increased too much around the peripheries of the lenses. When the conditions I is not satisfied, that is when $f\Delta$ is less than the lower limit $0.6f$, the negative distortion will be increased. On the other hand when $f\Delta$ is in excess of the upper limit $0.9f$, the back focal length will be reduced. When the optical separation of the surfaces 1 and 7 is lower than the lower limit of the condition II, the back focal length will be reduced. On the other hand, when the sum $$\sum_{1}^{6} d$$

is in excess of the upper limit $0.65f$, the object of the present invention for miniaturizing the lens system cannot be achieved. The diverging system consisting of a positive and negative meniscus lenses is known in the art, but when the conditions of the present invention must be satisfied in this diverging system, the radius of curvature of the concave surface of the negative meniscus lens must be made exceedingly small, thereby remarkably increasing the spherical aberration and coma. Therefore, the diverging system must be comprised of at least two negative meniscus lenses. The condition III is for eliminating the residual astigmatism which tends to occur at the center portion of the film plane when the lens system is miniaturized. The condition IV is necessary for correcting the sine condition which tends to be deteriorated in the positive direction due to the strong refracting force of the diverging system. Otherwise, the comma aberration is remarkably increased in the positive direction by the slanting light ray passing above the stop position related to the deterioration of the sine condition in the positive direction. Then correcting the errors by other surfaces becomes too difficult to carry out so that the condition IV must be satisfied.

When the $f$-number is 4, the angle of view 80° and the focal length $f=100$ in the lens system shown in FIG. 1, the design data are as follows:

| | | | |
|---|---|---|---|
| $R_1 = 180.00$ | $d_1 = 9.75$ | $n_1 = 1.6516$ | $\nu d_1 = 58.5$ |
| $R_2 = 339.3$ | $d_2 = 0.18$ | | |
| $R_3 = 140.97$ | $d_3 = 3.97$ | $n_2 = 1.6516$ | $\nu d_2 = 58.5$ |
| $R_4 = 47.83$ | $d_4 = 13.72$ | | |
| $R_5 = 71.30$ | $d_5 = 2.89$ | $n_3 = 1.6516$ | $\nu d_3 = 58.5$ |
| $R_6 = 40.25$ | $d_6 = 21.84$ | | |
| $R_7 = 76.61$ | $d_7 = 19.86$ | $n_4 = 1.67003$ | $\nu d_4 = 47.2$ |
| $R_8 = -144.40$ | $d_8 = 22.38$ | $n_5 = 1.6695$ | $\nu d_5 = 51.5$ |
| $R_9 = -92.60$ | $d_9 = 20.40$ | | |
| $R_{10} = -75.27$ | $d_{10} = 1.8$ | $n_6 = 1.7552$ | $\nu d_6 = 27.5$ |
| $R_{11} = 161.19$ | $d_{11} = 3.25$ | | |
| $R_{12} = -124.00$ | $d_{12} = 5.78$ | $n_7 = 1.60738$ | $\nu d_7 = 56.7$ |
| $R_{13} = -52.71$ | $d_{13} = 0.18$ | | |
| $R_{14} = 6317.0$ | $d_{14} = 6.50$ | $n_8 = 1.6425$ | $\nu d_8 = 58.1$ |
| $R_{15} = -76.79$ | | | |

Back focal length = 136.96
$f\Delta = -69.9$ $$\sum_1^6 d = 52.35$$

where
- $R$ = radius of curvature;
- $d$ = thickness of lens and airgap
- $n$ = index of refraction of glass used
- $d$ = Abbe's number of glass used;
- $B.f$ = Back focal length
- $f\Delta$ = compound focal length of the diverging system consisting of $L_1$, $L_2$ and $L_3$. FIGS. 2(A)–2(C) show the aberration curves of the lens system shown in FIG. 1. FIG. 2(A)

TABLE I

Figure 2D:
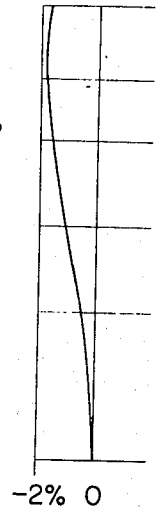
Figure 2E:
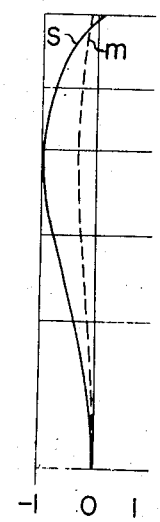

| | Spherical aberration | Coma | Curvature of Meridional Image | Curvature of Sagittal Image | Distortion |
|---|---|---|---|---|---|
| 1 | 0.041 | 0.052 | 0.416 | 0.285 | 0.360 |
| 2 | 0.001 | 0.005 | −0.002 | −0.078 | −0.663 |
| 3 | 0.013 | 0.021 | 0.372 | 0.308 | 0.470 |
| 4 | −6.484 | 0.419 | −0.906 | −0.852 | 0.055 |
| 5 | 3.972 | 0.479 | 0.726 | 0.611 | 0.074 |
| 6 | 26.414 | 1.677 | −1.300 | −1.087 | 0.069 |
| 7 | 18.965 | 1.540 | 0.903 | 0.650 | 0.053 |
| 8 | 0.000 | 0.000 | 0.000 | 0.000 | 0.000 |
| 9 | 6.835 | −2.166 | 2.491 | 1.119 | −0.355 |
| 10 | −7.330 | 1.635 | −1.666 | −0.936 | 0.209 |
| 11 | −3.969 | −2.101 | −3.603 | −1.379 | −0.730 |
| 12 | 0.001 | 0.006 | 0.636 | 0.009 | 0.439 |
| 13 | 4.334 | −0.673 | 1.031 | 0.821 | −0.128 |
| 14 | 0.001 | 0.009 | 0.173 | 0.054 | 0.363 |
| 15 | 11.187 | −1.082 | 0.824 | 0.614 | −0.060 |
| Σ | 1.152 | −0.170 | 0.095 | 0.139 | 0.156 | shows the coma; FIG. 2(B), the spherical aberration; FIG. 2(C), astigmatism; FIG. 2(D), the distortion and FIG. 2(E), the astigmatism when the magnifying power is one-thirthieth. The Seidel aberration coefficients upon the refracting surfaces are shown in table 1.

FIG. 3 shows a sectional view of a second embodiment of the present invention. When the $f$-number is 2.8, the field, 76° and the focal length $f=100$, the design data are as follows: ($R_8$, $n_5$ and $\nu d_5$ are not given)

| | | | |
|---|---|---|---|
| $R_1 = 183.46$ | $d_1 = 9.25$ | $n_1 = 1.64831$ | $\nu d_1 = 33.8$ |
| $R_2 = 356.30$ | $d_2 = 0.2$ | | |
| $R_3 = 141.73$ | $d_3 = 3.94$ | $n_2 = 1.62041$ | $\nu d_2 = 60.3$ |
| $R_4 = 49.02$ | $d_4 = 13.78$ | | |
| $R_5 = 78.54$ | $d_5 = 2.95$ | $n_3 = 1.6583$ | $\nu d_3 = 57.3$ |
| $R_6 = 45.77$ | $d_6 = 26.77$ | | |
| $R_7 = 82.09$ | $d_{7+8} = 40.55$ | $n_4 = 1.6695$ | $\nu d_4 = 51.5$ |
| $R_9 = -109.25$ | $d_9 = 20.67$ | | |
| $R_{10} = -73.82$ | $d_{10} = 2.95$ | $n_6 = 1.74$ | $\nu d_6 = 28.2$ |
| $R_{11} = 163.39$ | $d_{11} = 5.9$ | | |
| $R_{12} = -183.07$ | $d_{12} = 6.5$ | $n_7 = 1.62041$ | $\nu d_7 = 60.3$ |
| $R_{13} = -57.87$ | $d_{13} = 0.2$ | | |
| $R_{14} = 13780.0$ | $d_{14} = 6.6$ | $n_8 = 1.6968$ | $\nu d_8 = 55.6$ |
| $R_{15} = -93.17$ | | | |

Back focal length = 138.82
$f\Delta = -80.56$ $$\sum_1^6 d = 56.89$$

$R$, $d$, $n$, $\nu d$, $Bf$ and $f\Delta$ are same to those described hereinabove.

Figure 4A:
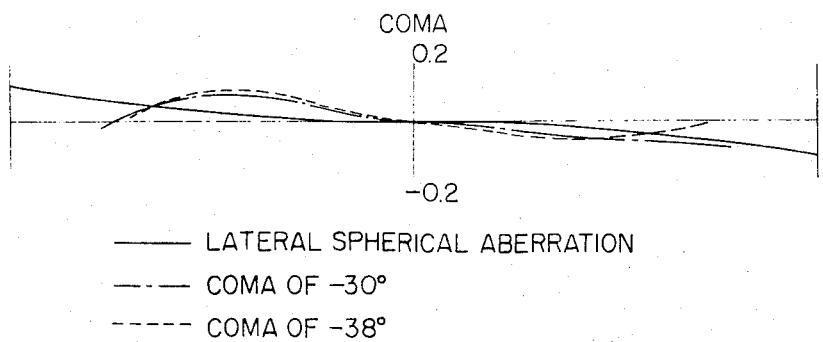
Figure 4B:
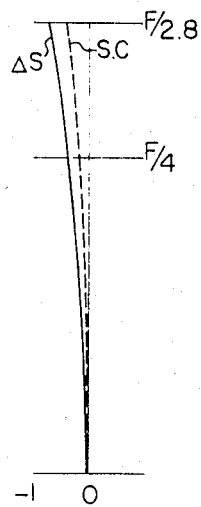
Figure 4C:
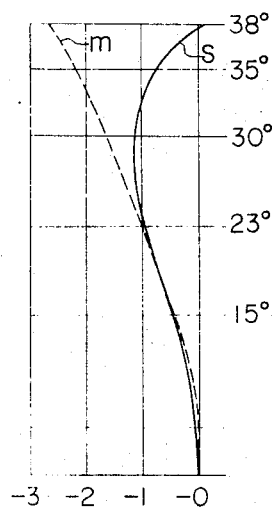
Figure 4D:
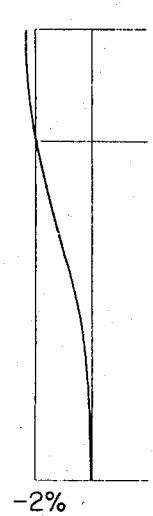

FIG. 4(A) shows the coma, FIG. 4(B), the spherical aberration; FIG. 4(C), the astigmatism; and FIG. 4(D), the distortion of the lens system above in FIG. 3.

What is claimed is:

1. A retrofocus-type lens system comprising a positive meniscus lens ($L_1$) the convex surface of which is for direction toward an object to be photographed, negative meniscus lenses ($L_2$, $L_3$) the convex surfaces of which are for direction toward the object, a positive lens ($L_4$), a negative lens ($L_5$), a positive meniscus lens ($L_6$) the concave surface of which is for direction toward the object, and a positive lens ($L_7$) of which the detailed data is as follows:

| | | | | |
|---|---|---|---|---|
| $L_1$ | $\{R_1 = 180.00$ | $d_1 = 9.75$ | $n_1 = 1.6516$ | $\nu d_1 = 58.5$ |
| | $\{R_2 = 339.3$ | $d_2 = 0.18$ | | |
| $L_2$ | $\{R_3 = 140.97$ | $d_3 = 3.97$ | $n_2 = 1.6516$ | $\nu d_2 = 58.5$ |
| | $\{R_4 = 47.83$ | $d_4 = 13.72$ | | |
| $L_3$ | $\{R_5 = 71.30$ | $d_5 = 2.89$ | $n_3 = 1.6516$ | $\nu d_3 = 58.5$ |
| | $\{R_6 = 40.25$ | $d_6 = 21.84$ | | |
| $L_4$ | $\{R_7 = 76.61$ | $d_7 = 19.86$ | $n_4 = 1.67003$ | $\nu d_4 = 47.2$ |
| | $\{R_8 = -144.40$ | $d_8 = 22.38$ | $n_5 = 1.6695$ | $\nu d_5 = 51.5$ |
| | $\{R_9 = -92.60$ | $d_9 = 20.40$ | | |
| $L_5$ | $\{R_{10} = -75.27$ | $d_{10} = 1.8$ | $n_6 = 1.7552$ | $\nu d_6 = 27.5$ |
| | $\{R_{11} = 161.19$ | $d_{11} = 3.25$ | | |
| $L_6$ | $\{R_{12} = -124.00$ | $d_{12} = 5.78$ | $n_7 = 1.60738$ | $\nu d_7 = 56.7$ |
| | $\{R_{13} = -52.71$ | $d_{13} = 0.18$ | | |
| $L_7$ | $\{R_{14} = 6317.0$ | $d_{14} = 6.50$ | $n_8 = 1.6425$ | $\nu d_8 = 58.1$ |
| | $\{R_{15} = -76.79$ | | | | where
- $R$ = radius of curvature;
- $d$ = thickness of lens and air gap;
- $n$ = index of refraction of glass used;
- $\nu d$ = Abbe number of glass used;
- $B.f$ = Back focal length; and
- $f/\Delta$ = compound focal length of the diverging system consisting of $L_1$, $L_2$, and $L_3$.

$$\sum_{1}^{6} d =$$

the optical separation of the surfaces 1 and 7 ($d_1+d_2+d_3+d_4+d_5+d_6$).

2. A retrofocus-type lens system comprising a positive meniscus lens ($L_1$) the convex surface of which is for direction toward an object to be photographed, negative meniscus lenses ($L_2$, $L_3$) the convex surfaces of which are for direction toward the object, a positive lens ($L_4$), a negative lens ($L_5$), a positive meniscus lens ($L_6$) the concave surface of which is for direction toward the object, and a positive lens ($L_7$) of which the detailed data is as follows:

| | | | | |
|---|---|---|---|---|
| $L_1$ | $R_1=183.46$ | $d_1=9.25$ | $n_1=1.64831$ | $\nu d_1=33.8$ |
| | $R_2=356.30$ | $d_2=0.2$ | | |
| $L_2$ | $R_3=141.73$ | $d_3=3.94$ | $n_2=1.62041$ | $\nu d_2=60.3$ |
| | $R_4=49.02$ | $d_4=13.78$ | | |
| $L_3$ | $R_5=78.54$ | $d_5=2.95$ | $n_3=1.6583$ | $\nu d_3=57.3$ |
| | $R_6=45.77$ | $d_6=26.77$ | | |
| $L_4$ | $R_7=82.09$ | $d_7+=40.55$ | $n_4=1.6695$ | $\nu d_4=51.5$ |
| | $R_8=-109.25$ | $d_9=20.67$ | | |
| $L_5$ | $R_{10}=73.82$ | $d_{10}=2.95$ | $n_5=1.74$ | $\nu d_5=28.2$ |
| | $R_{11}=163.39$ | $d_{11}=5.9$ | | |
| $L_6$ | $R_{12}=-193.07$ | $d_{12}=6.5$ | $n_6=1.62041$ | $\nu d_6=60.3$ |
| | $R_{13}=-57.87$ | $d_{13}=0.2$ | | |
| $L_7$ | $R_{14}=13780.0$ | $d_{14}=6.6$ | $n_7=1.6988$ | $\nu d_7=55.6$ |
| | $R_{15}=-93.17$ | | | |

Back focal length = 138.82
$f/\Delta = -80.56$ $$\sum_{1}^{6} d = 56.89$$

where
- $R$ = radius of curvature;
- $d$ = thickness of lens and air gap;
- $n$ = index of refraction of glass used;
- $\nu d$ = Abbe number of glass used;
- $B.f$ = Back focal length; and
- $f/\Delta$ = compound focal length of the diverging system consisting of $L_1$, $L_2$, and $L_3$.

$$\sum_{1}^{6} d =$$

the optical separation of the surfaces 1 and 7 ($d_1+d_2+d_3+d_4+d_5+d_6$).

* * * * *

UNITED STATES PATENT OFFICE
CERTIFICATE OF CORRECTION

Patent No. 3,635,546            Dated January 18, 1972

Inventor(s)   Ikuo Mori

It is certified that error appears in the above-identified patent and that said Letters Patent are hereby corrected as shown below:

Column 4, beginning line 75 insert -- Back focal length = 136.96

$$f \Delta = -69.9$$

$$\sum_{1}^{6} d = 52.35$$

Column 6, line 2 change "$d_7+$" to -- $d_7+8$ -- ;

line 10 change "1.6988" to -- 1.6968 --.

Signed and sealed this 13th day of March 1973.

(SEAL)
Attest:

EDWARD M. FLETCHER, JR.          ROBERT GOTTSCHALK
Attesting Officer                   Commissioner of Patents